United States Patent [19]

Maeda

[11] Patent Number: 5,255,201
[45] Date of Patent: Oct. 19, 1993

[54] NUMERICAL CONTROL INFORMATION GENERATING APPARATUS

[75] Inventor: Takeharu Maeda, Niwa, Japan

[73] Assignee: Kabushiki Kaisha Okuma Tekkosho, Aichi, Japan

[21] Appl. No.: 672,661

[22] Filed: Mar. 21, 1991

[30] Foreign Application Priority Data

Mar. 30, 1990 [JP] Japan ................................ 2-84388

[51] Int. Cl.⁵ .............................................. G05B 19/19
[52] U.S. Cl. ........................... 364/474.35; 364/474.15; 364/193
[58] Field of Search ...................... 364/474.35, 474.15, 364/474.11, 554, 193, 151

[56] References Cited

U.S. PATENT DOCUMENTS

| | | | |
|---|---|---|---|
| 4,570,385 | 2/1986 | Richter et al. | 364/193 X |
| 4,603,392 | 7/1986 | Chikamoto et al. | 364/474.35 |
| 4,706,002 | 11/1987 | Fukuyama | 364/193 X |
| 4,750,105 | 6/1988 | Ohkawa | 364/474.15 |
| 4,819,195 | 4/1989 | Bell et al. | 364/464.35 |
| 4,902,951 | 2/1990 | Ohta et al. | 364/474.35 |
| 4,942,611 | 7/1990 | Kunugi et al. | 364/474.35 |

Primary Examiner—Jerry Smith
Assistant Examiner—Brian C. Oakes
Attorney, Agent, or Firm—Wenderoth, Lind & Ponack

[57] ABSTRACT

A numerical control information generating apparatus has a function of automatically correcting machining conditions by calculating corrected machining conditions from corrected numerical control information. The apparatus also has a valid/invalid setting function of automatically correcting machining conditions for the purpose of allowing an operator to select at will the conditions under which the function of automatically correcting machining condition works, and a numerical control information correcting section, in which a machining conditions automatic correction command is provided, so as to perform machining conditions automatic correction at any time as required. As a result, since machining conditions are corrected automatically by correcting numerical control information, an operator can set proper machining conditions easily even if the operator does not understand the relationship between the machining conditions and the generated numericaL control information.

4 Claims, 13 Drawing Sheets

MACHINING DIRECTION
DETERMINATION VALUE AR | 0.5

CUTTING CONDITION TABLE

|  | CUTTING SPEED V | FEED SPEED F | CUTTING DEPTH D |
|---|---|---|---|
| MATERIAL CODE 1 | 200 m/min | 0.5 mm/r | 5.0 mm |
| MATERIAL CODE 2 | 120 m/min | 0.6 mm/r | 8.0 mm |
| MATERIAL CODE 3 | 80 m/min | 0.5 mm/r | 7.0 mm |
| ⋮ | | | |
| MATERIAL CODE n | 160 m/min | 0.7 mm/r | 8.0 mm |

FIG. 2

|   | LONGISH FREQUENCY | FACE FREQUENCY |
|---|---|---|
| 0 | 0 | 7 |
| 1 | 0 | 16 |
| 2 | 0 | 11 |
| 3 | 1 | 8 |
| 4 | 3 | 2 |
| 5 | 6 | 0 |
| 6 | 15 | 0 |
| 7 | 20 | 0 |
| 8 | 12 | 0 |
| 9 | 4 | 0 |

FIG. 11

NUMERICAL CONTROL INFORMATION GENERATING APPARATUS

BACKGROUND OF THE INVENTION

1. Field of the Invention

The present invention relates to a numerical control information generating apparatus that generates numerical control information used for numerical control machining and, in particular, to a numerical control information generating apparatus characterized by the utilization of a machining method in which the determination and cutting conditions are set.

2. Description of the Prior Art

Numerical control information generating apparatuses have been put to practical use which generate numerical control information such as NC programs according to design drawings by accepting necessary data on an interactive basis using a figure display device.

In such numerical control information generating apparatus, machining shapes can be input by depressing corresponding keys, buttons or the like on an operation panel according to the shapes of parts described in a design drawing. Various data such as dimensions can be input in response to enquiries using everyday language. In addition, the instant all data necessary to determine a shape is input, the shape is drawn on a screen, and thus, whether the input data is correct or not can be confirmed. When all data necessary to generate numerical control information is input, numerical control information is generated automatically by calculations in accordance with machining conditions which have been previously set, and a tool path is graphically displayed. When the operator makes a judgement that it is desirable to optimize the numerical control information in which various conditions at the time of machining are taken into account, the tool path and cutting conditions can be corrected on an interactive basis.

The above-described conventional numerical control information generating apparatus will be explained with reference to the block diagram of FIG. 1.

An input device 1 is a device such as an operation panel, which is provided with various operation buttons and keys. A display device 2 is a character and figure display device. An operator operates the numerical control information generating apparatus using the input device 1 and the display device 2. Displayed on the display device 2 are guidances concerning such matters as machining conditions correction, machining shape input, numerical control information generation, numerical control information correction and numerical control information output. By operating operation buttons or keys of the input device 1 that correspond to guidance displays, each of the processing sections can be invoked. If operation buttons or keys corresponding to machining conditions correction are operated, a machining conditions correction processing section 3 is invoked. This machining condition correcting section 3 enables machining conditions of a machining condition storage section 4 to be corrected prior to the generation of the numerical control information. As shown in FIG. 2, the machining conditions consist of a machining direction determination value AR and data denoting the cutting condition table. Guidance is displayed on the display device 2. If the operation buttons or keys of the input device 1 corresponding to correction items are operated by following the data of the display, the current set values and guidances are displayed on the display device 2. The input of new values set via the operation buttons or keys of the input device 1 causes the machining conditions to be corrected. The machining condition storage section 4 is composed of storage devices whose contents are not erased even if the power supply of the numerical control information generating apparatus is cut off due to accidents, etc. Therefore, the values which have been set are retained until they are reset.

When the operation buttons or keys corresponding to the machining shape input are operated, a machining shape inputting section 5 is invoked. This machining shape inputting section 5 enables the operator to input machining shapes to a machining shape storage section 6 according to design drawings. A machining shape consists of a machining shape CF and a material code M, as shown in FIG. 3. First, a material code is input via the operation buttons or keys of the input device 1 by following the guidance display of the display device 2. Next, if the operation buttons or keys of the input device 1 corresponding to shape elements such as a straight line and an arc are depressed, guidances concerning such matters as coordinate values and radiuses, are displayed on the display device 2. Necessary shape elements are input one by one by the operation such that the numerical values written on the design drawing are input through the input device 1 in accordance with the guidance display. Thus a machining shape is input. In addition, when the operation buttons or keys corresponding to numerical control information generation are operated, a numerical control information generating section 7 is invoked. This numerical control information generating section 7 reads out a machining shape and machining conditions, and numerical control information is formed in a numerical control information storage section 9. The numerical control information consists of a tool path CP, a machining direction code CM, cutting conditions, etc., as shown in FIG. 4.

The operations of the numerical control information generating section 7 will now be explained with reference to a flow chart shown in FIG. 5.

First, a lateral size H, a longitudinal size V and a machining radius R of FIG. 3 are determined on the basis of the machining shape CF (Step S1). Such data is determined by surveying all the coordinate values of shape elements, such as straight lines and arcs, forming the machining shape CF and by defining the difference between a maximum value and a minimum value of Z-coordinates to be the lateral size H, one half the difference between a maximum value and a minimum value of X-coordinates to be the longitudinal size V and one half the minimum value of the X-coordinate to be the machining radius R. Next, "H/(H+V)" is calculated. This value is compared with the machining direction determination value AR. Thus, whether the machining shape CF is longer sideways or lengthways than the shape indicated by the machining direction determination value AR can be determined (Step S2). When the value "H/(H+V)" is greater than the machining direction determination value AR, the machining shape CF is long sideways, and a numeral "1" indicating the longish direction is set in the machining direction code CM (Step S3). When, on the contrary, it is smaller, it is long lengthways, and a numeral "2" indicating the face direction is set in the machining direction code CM (Step S4).

Next, a tool path CP is generated according to the machining direction code CM, and it is written in the numerical control information storage section 9. This process is performed in such a way that, when the machining direction code CM is "1", shape elements such as straight lines and arcs forming the machining shape CF stored in sequence are rearranged in such a manner for the Z-coordinate values to be in a descending order, and when the machining direction code CM is "2", shape elements are rearranged in such a manner for the X-coordinate values to be in a descending order, and then they are written in the tool path CP of the numerical control information storage section 9 (Step S5). The line position in the cutting condition table of the machining condition storage section 4 is determined using a material code M in order to read out a cutting speed V (FIG. 2), and a feed speed F and a cutting depth D are written in the feed speed F and the cutting depth D of the numerical control information storage section 9 (FIG. 4) (Step S6). Then, a revolution S is determined by $S = 1000 \times V/(2 \times \pi \times R)$ using the cutting speed V and the machining radius R, and this revolution S is written in the number of rotations S of the numerical control information storage section 9 (Step S7).

When the numerical control information is generated, the tool path CP, the machining direction code CM and the cutting conditions are displayed on the display device 2. Thus, the generated numerical control information can be confirmed.

In addition, if the operation buttons or keys corresponding to numerical control information correction are operated, a numerical control information correcting section 8 is invoked. This numerical control information correcting section 8 enables numerical control information to be corrected to further optimized information on the judgement made by the operator. The operations of the numerical control information correcting section 8 will be explained with reference to a flow chart of FIG. 6.

First, guidances concerning such matters as a machining method, cutting conditions and termination are displayed on the display device 2. At the same time, commands from the operator via the operation buttons or keys corresponding to the guidance display are accepted (Step S10), and the contents of the operated command are analyzed and branched according to the command (Step S11). If the command is a machining method, a correction value of the machining direction code CM can be input via the input device 1 by following the guidance display. When the machining direction code CM is corrected, the tool path CP is automatically calculated by the same process as the Step S5 of FIG. 5, and the tool path CP is displayed on the display device 2 (Step S12). When the correction process on the machining method is terminated, the process returns to the Step S10. If the content of the command is a cutting condition, a corresponding guidance is displayed on the display device 2. The input of a new value set via the input device 1 causes the cutting condition to be corrected (Step S13). When the correction process of the cutting conditions is terminated, the process returns to the Step S10. If the content of the command is termination, the numerical control information correction processing is terminated.

When operations corresponding to numerical control information output are input through the input device 1, a numerical control information outputting section 10 is invoked. This numerical control information outputting section 10 allows numerical control information to be converted into such form as an NC program. Thus, it can be retrieved from an output device 11 such as a floppy disk drive device or a paper tape puncher. In a case where this apparatus is incorporated into a numerical control machine tool, the numerical control information outputting section 10 enables numerical control information to be transferred into the NC control machine tool. Thus, direct machining can be performed.

In the above-described numerical control information generating apparatus, an operator does not need to study a machining method before data is input and a novice not familiar with the machining method can handle it with ease. In the case of an experienced operator, it is possible to reduce efforts expended for studying and correcting the numerical control information as required. However, advantages results in the case where cutting conditions are properly set. If the cutting conditions are not proper, they must be corrected. There have been problems in that since there is data pertaining to the kinds of machining, such as cutting machining, groove machining, screw machining, drill machining, and according to each work material, the number of items of cutting conditions is large, and further problems exist in that the relationship between the cutting conditions and the generated numerical control information is difficult to understand if an operator does not to some extent understand the automatic calculation method of the numerical control information generating process, and thus it is difficult for the operator to set cutting conditions properly.

SUMMARY OF THE INVENTION

The present invention has been devised in light of the above-mentioned circumstances. An object of the present invention is to provide a numerical control information generating apparatus which is capable of setting proper machining conditions easily even if an operator does not understand the relationship between the machining conditions and the generated numerical control information.

According to one aspect of this invention, for achieving the objects described above, there is provided a numerical control information generating apparatus having means for generating numerical control information on the basis of machining conditions, a machining shape, etc. from which the numerical control information is generated and for correcting the generated numerical control information, the apparatus having a function of automatically correcting the machining conditions on the basis of the correction results of the numerical control information.

These and other objects, features and advantages of the present invention will becomes clear when reference is made to the following description of the preferred embodiments of the present invention, together with reference to the accompanying drawings.

BRIEF DESCRIPTION OF THE DRAWINGS

In the accompanying drawings:

FIG. 2 is a view explaining a machining conditions storage section;

FIG. 11 is a view explaining a frequency distribution table;

DESCRIPTION OF THE PREFERRED EMBODIMENT

Figure 1:
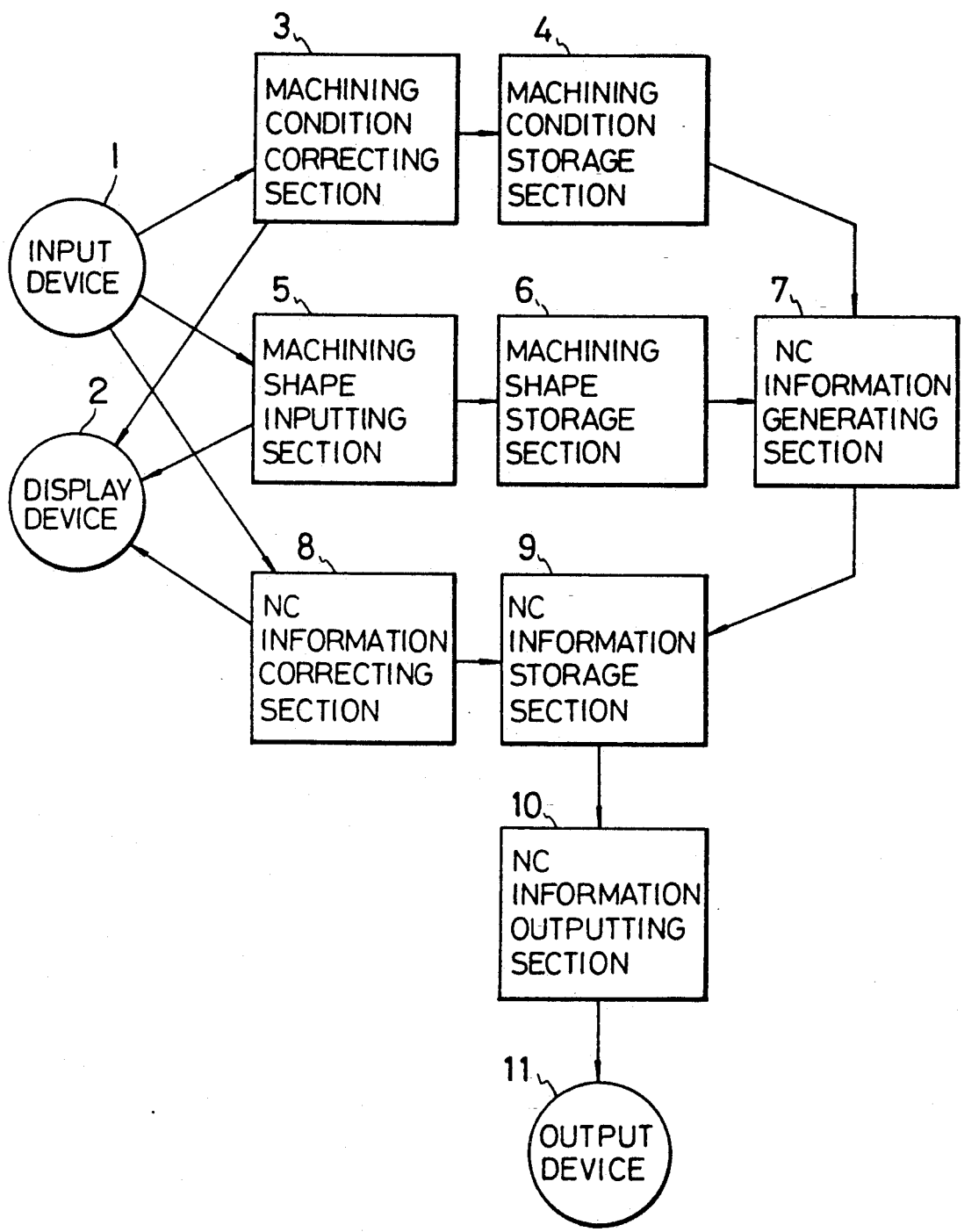
FIG. 1 is a block diagram showing an example of a conventional numerical control information generating apparatus.
Figure 3:
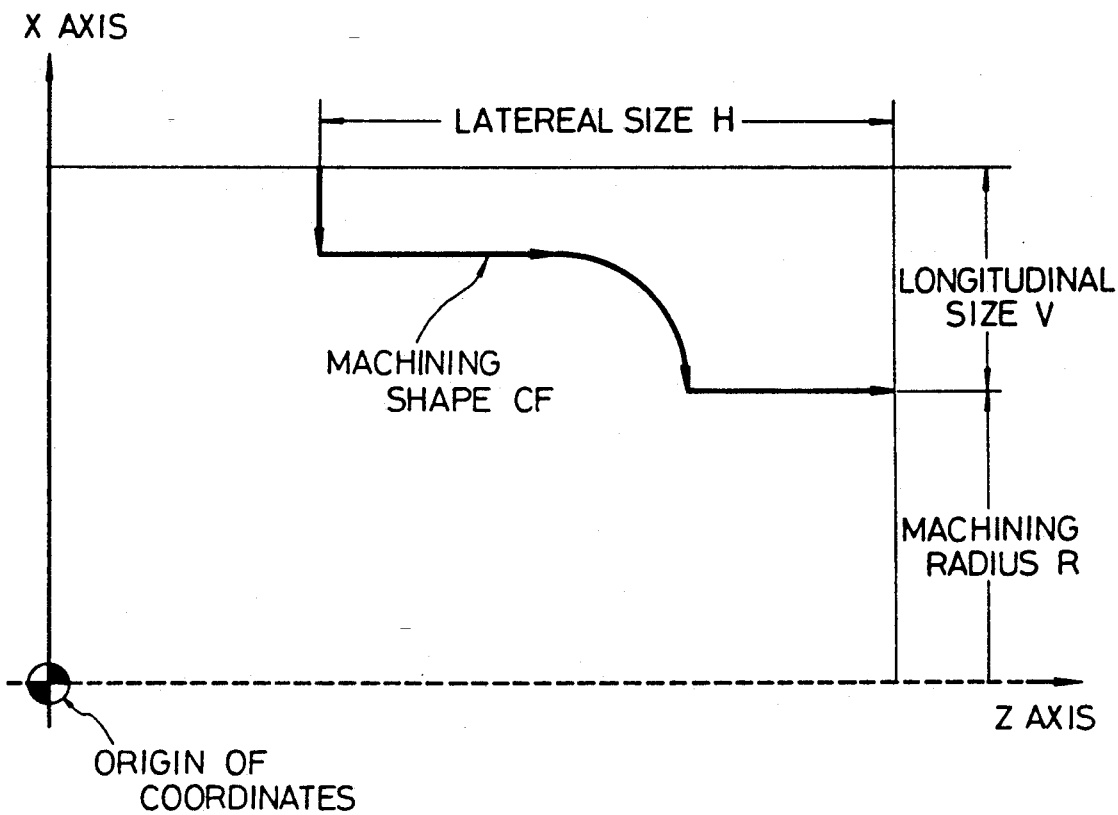
FIG. 3 is a view explaining a machining shape storage section.
Figure 4:
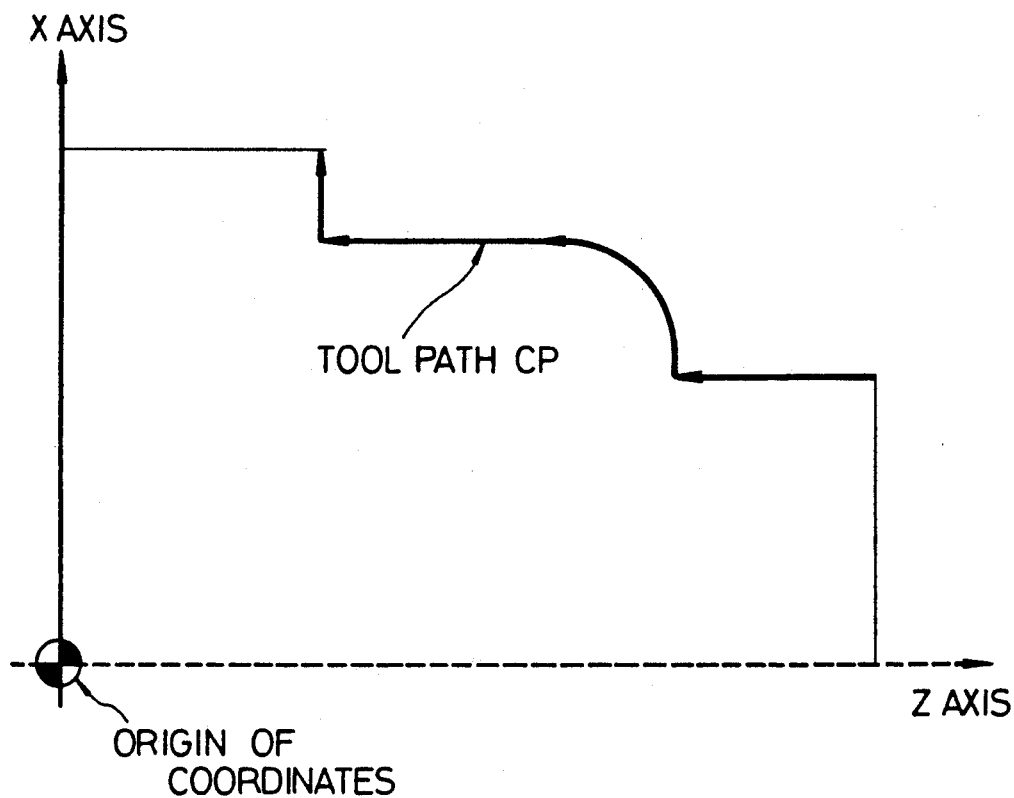
FIG. 4 is a view explaining a conventional numerical control information storage section.
Figure 7:
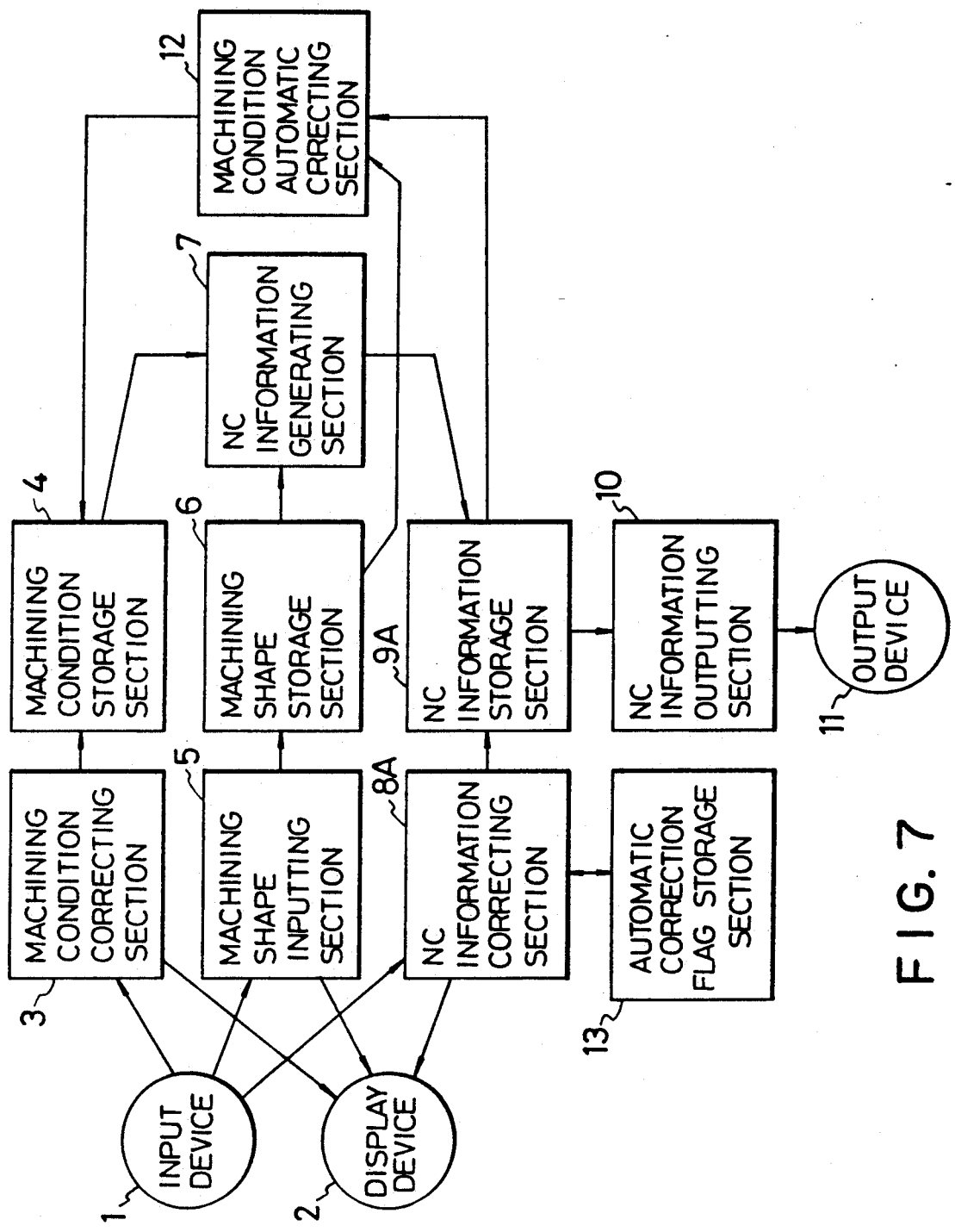
FIG. 7 is a block diagram showing an example of a numerical control information generating apparatus of the present invention.

An embodiment of the present invention will be explained hereinunder with reference to the block diagram of FIG. 7. FIG. 7 is a block diagram of an embodiment of a numerical control information generating apparatus of the present invention. Parts in FIG. 7 which correspond to parts in FIG. 1 are given the same reference numerals as in FIG. 1, and an explanation thereof is omitted below.

Figure 8:
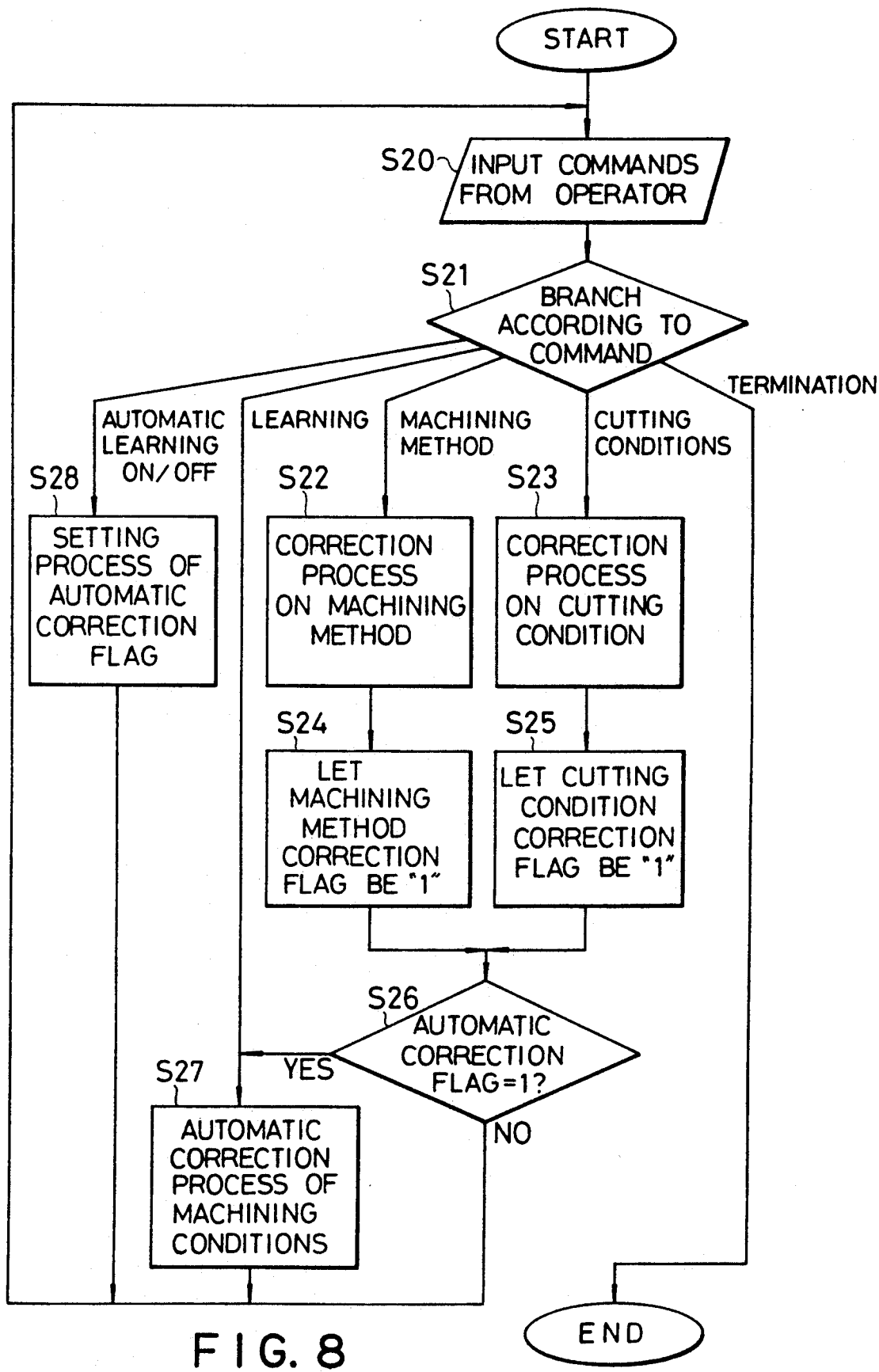
FIG. 8 is a flow chart explaining a numerical control information correction process of the present invention.

A numerical control information correcting section 8A of the present invention is invoked in the same manner as in the prior art by the operation in which corresponding operation buttons or keys are operated by following the guidance display of the display device 2. The operations of the numerical control information correcting section 8A will be explained with reference to the flow chart of FIG. 8.

Figure 6:
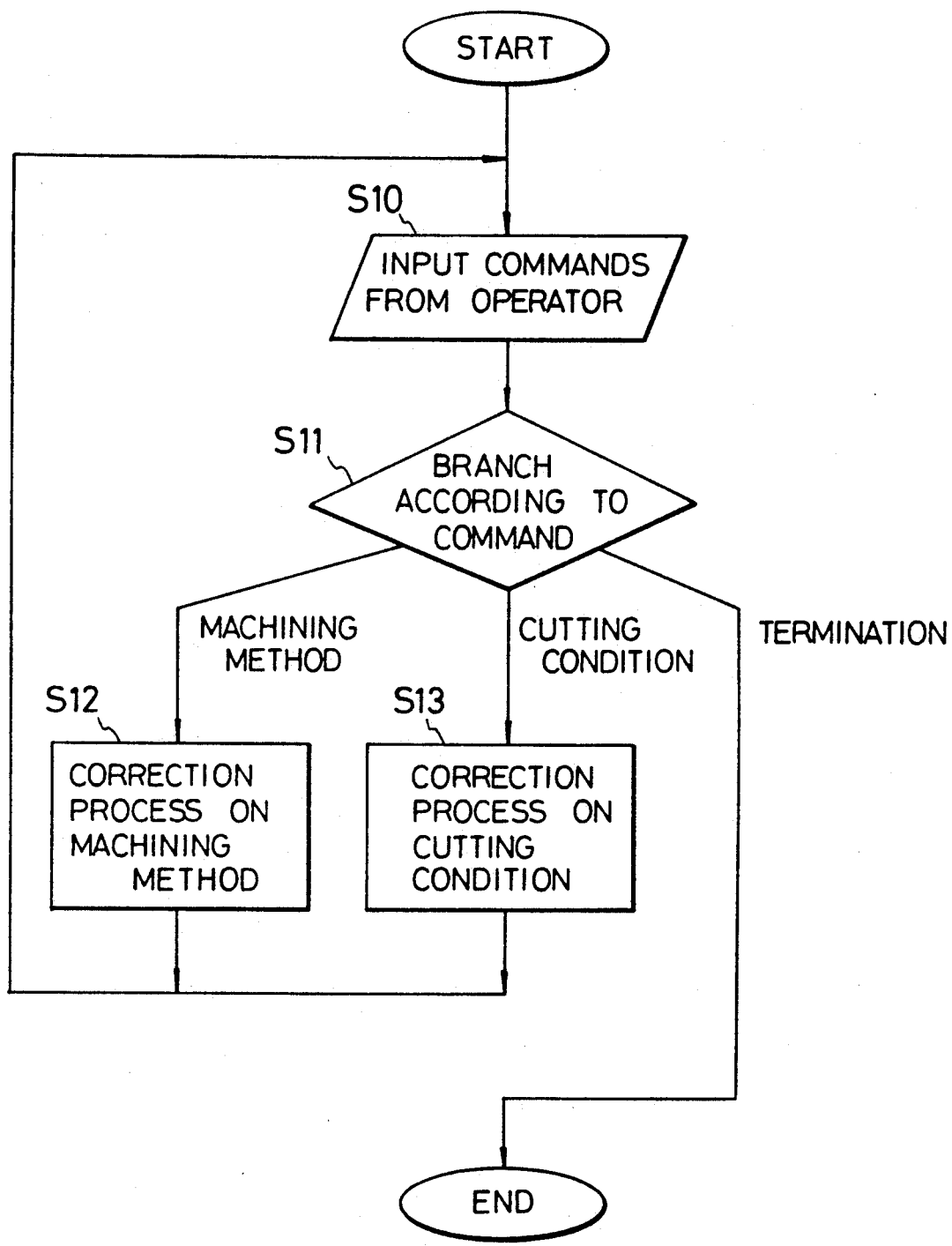
FIG. 6 is a flow chart explaining a conventional numerical control information correction process.
Figure 9:
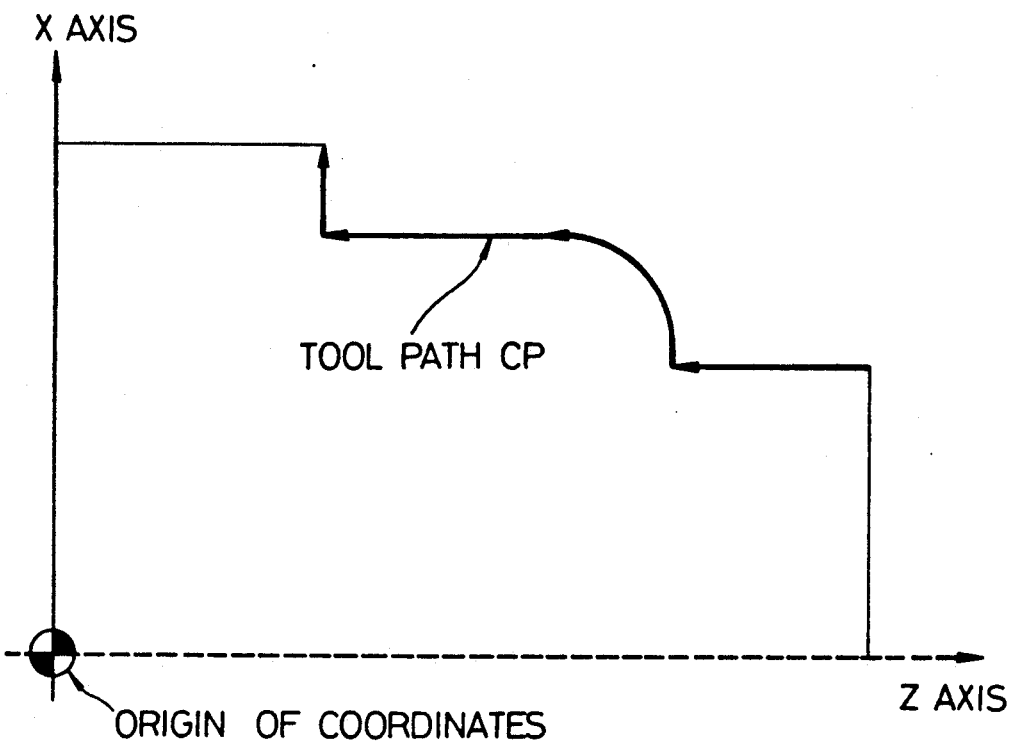
FIG. 9 is a view explaining a numerical control information storage section of the present invention.

First, guidances concerning such matters as a machining method, cutting conditions, termination, learning, and automatic learning on/off are displayed on the display device 2, and at the same time, commands corresponding to the guidance display input via the input device 1 by an operator are accepted (Step S20). The content of the input command is analyzed and branched according to the command (Step S21). If the command is a machining method, a process for updating the machining method is performed in the same way as in the above-mentioned Step S12 of FIG. 6 (Step S22). The machining method correction flag of a numerical control information storage section 9A shown in FIG. 9 is set to "1", and the process proceeds to the Step S26 (Step S24). If the command is a cutting condition, a process for updating the cutting conditions is performed in the same way as in the Step S13 of FIG. 6 (Step S23). The cutting condition correction flag of the numerical control information storage section 9A shown in FIG. 9 is set to "1", and the proceeds to the process Step S26 (Step S25). The machining method correction flag and the cutting conditions correction flag have been previously set to "0" by the numerical control information generating section 7. In the above-mentioned Step S26, whether or not the value of the automatic correction flag of an automatic correction flag storage section 13 is "1" is determined. If it is "1", the process proceeds to the Step S27; if it is not "1", the process returns to the Step S20 (Step S26).

If the input command is learning, a machining condition automatic correction process which will be described later is performed, and the process returns to the Step S20 (Step S27). If the input command is automatic learning on/off, the current set value of the automatic correction flag and the guidances are displayed on the display device 2. The input of new values set via the input device 1 enables the automatic correction flag to be set. When the setting is terminated, the process returns to the Step S20 (Step S28). Since the automatic correction flag storage section 13 is composed of storage devices which are not erased even if the power of the numerical control information generating apparatus is cut off, the set values are retained until the automatic correction flag storage section 13 is reset. If the input command is termination, the numerical control information correction process is terminated.

Figure 10:
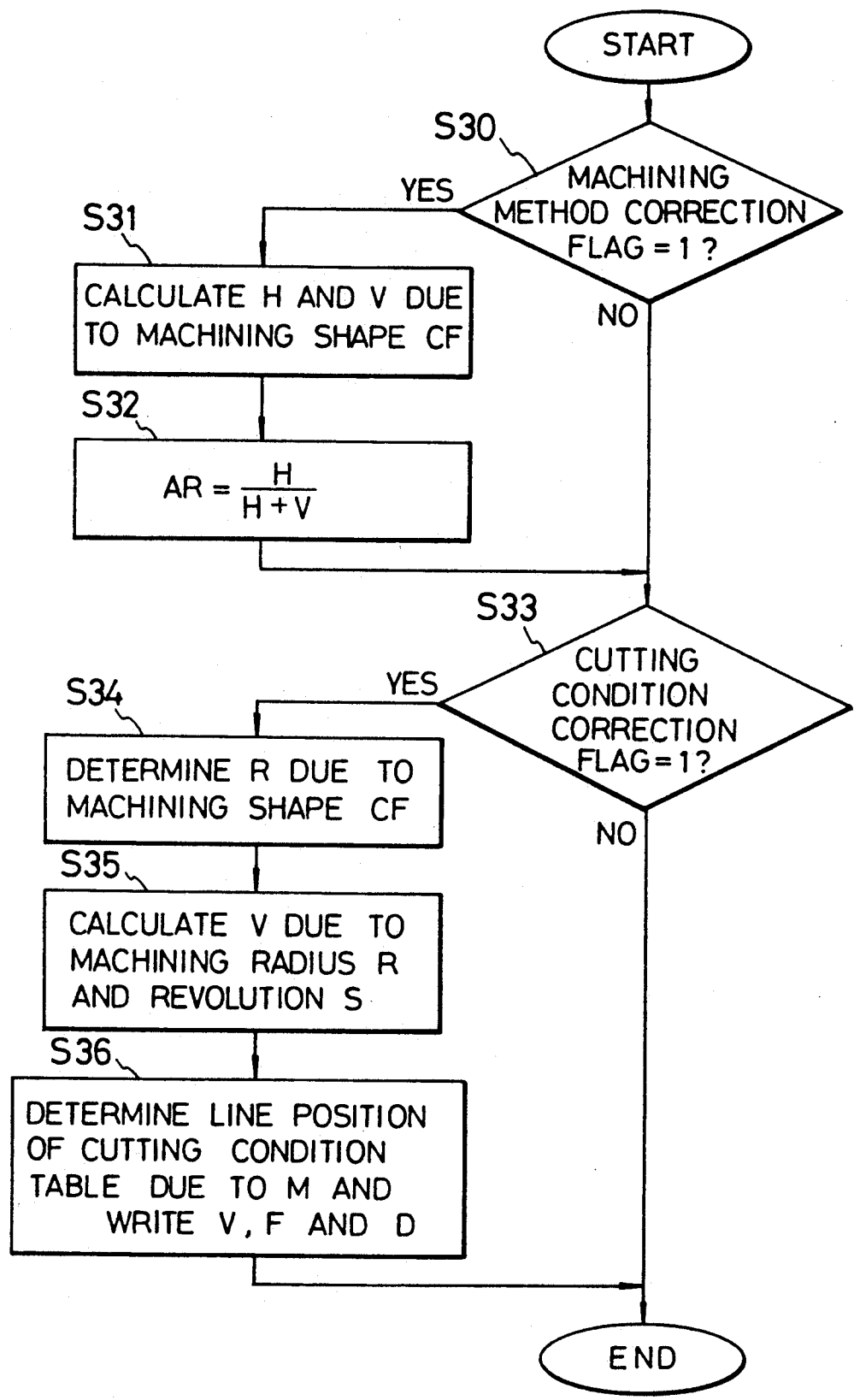
FIG. 10 is a flow chart explaining the main section of the present invention.

A machining condition automatic correcting section 12 automatically corrects the machining conditions on the basis of the results of the correction of numerical control information. The machining condition automatic correcting section 12 constitutes the main part of the present invention. This machining condition automatic correcting section 12 is invoked when a correction of the numerical control information should be made, as explained in the numerical control information correcting section 8A, and is not invoked when no correction should be made. It is also not invoked when the numerical control information correcting section 8A is not performed. The operations of the machining condition automatic correcting section 12 will now be explained with reference to the flow chart of FIG. 10.

First, whether or not the machining method correction flag is "1" is determined (Step S30). If it is "1", the process proceeds to the Step S31; if it is not "1", the process proceeds to the Step S33. When the machining method correction flag is "1", the lateral size H and the longitudinal size V are calculated in the same way as in the above-mentioned Step S1 of FIG. 5 (Step S31). Value "H/(H+V)" is calculated and it is written in the machining direction determination value AR (Step S32). Thus, the machining direction determination value AR, with the machining shape CF of the machining shape storage section 6 being a reference, can be set. Next, whether or not a cutting condition correction flag is "1" is determined (Step S33). When it is "1", the process proceeds to the Step S34; when it is not "1", the machining condition automatic correction process is terminated. When the cutting condition correction flag is "1", the machining radius R is determined in the same way as in the above-mentioned Step S1 of FIG. 5 (Step S34). Then, the cutting speed V is calculated from an equation $V = 2 \times \pi \times R \times S/1000$ on the basis of the machining radius R and the revolution S of the numerical control information storage section 9A (Step S35). The line position of the cutting conditions table of the machining condition storage section 4 is determined according to the material code M of the machining shape storage section 6. The cutting speed V, the feed speed F and the cutting depth D of the numerical control information storage section 9A are written in the cutting speed V, the feed speed F and the cutting depth D of the cutting condition table, and then the machining condition automatic correction process is terminated (Step S36). As a result, a setting can be made at a pertinent position of the cutting condition table by inversely calculating the cutting conditions using the corrected numerical control information.

In the above description, an example of lathe turning machining was shown. However, needless to say, the same effect can be obtained when the present invention is applied to such kinds of machining as groove machining, screw machining and drill machining. The present invention can also be applied to milling cutter machining, end mill machining and grinding machining.

That is, in drilling machining, numerical control information is generated in such a way that when the value "H/(H+V)" determined on the basis of the depth H of a hole and the diameter D of a hole is greater than a determination value, the drill machining is performed and when it is smaller, face machining is performed. When the numerical control information is corrected, the cutting conditions can be corrected automatically by determining the value "H/(H+V)" on the basis of the machining shape and writing it in the determination value. In groove machining, the numerical control information is generated in such a way that when the width W of a groove is greater than the determination value, machining is performed by a plurality of cutting operations, and when it is smaller, by one cutting operation. If the numerical control information is corrected, the cutting conditions can be corrected by writing the width W in the determination value. In the milling cutter machining, the revolution S [rpm] and the feed speed F [mm/min.] of the numerical control information are determined on the basis of the diameter D [mm] of a tool, the number N [piece] of blades of the tool, and the cutting speed V [m/min.] and feed quantity FT [mm/blade] per blade in the cutting condition table from the following two equations:

$$S = 1000 \times V/(\pi \times D) \quad (1)$$

$$F = FT \times N \times 1000 \times V/(\pi \times D) \quad (2)$$

In the above manner the numerical control information is generated. In a case where the numerical control information is corrected, the machining conditions can be corrected automatically by a method in which the cutting speed V and the feed quantity FT per blade are inversely calculated using equations $$V = \pi \times D \times S/1000 \quad (3)$$

$$FT = F/(N \times S) \quad (4)$$

The line position in the cutting condition table is determined using a material code, and the above values V and FT are written in the cutting condition table.

In other kinds of machining, equations for determining cutting conditions of the numerical control information from the cutting condition table are simple. When the numerical control information is corrected, it is easy to derive the equations for inversely calculating values to be written in the cutting condition table on the basis of the cutting conditions of the numerical control information. In the above explanation, a method is shown in which the lateral size H and the longitudinal size V are determined, a determination value is inversely calculated by the value "H/(H+V)", and it is written in the machining direction determination value AR as it is. In addition to the above method, the following methods may be considered: a method in which past determination values and numerical control information related to the determination values are stored in sequence, and a value to be written in the determination value of the machining conditions is determined by using a statistical technique using average values, weighted average values, and a frequency distribution table; and a method in which average values, weighted average values, and a frequency distribution table are stored, and by using them, a value to be written in the determination value of the machining conditions is determined.

The method in which average values, weighted average values, and a frequency distribution table are stored, and by using them, a value to be written in the determination value of the machining conditions is determined, will be explained in detail below.

First, the frequency distribution table shown in FIG. 11 is added to the machining condition storage section 4 shown in FIG. 7. This frequency distribution table consists of two arrays whose subscript is from "0" to "9", and a longish frequency and a face frequency respectively indicating the number of machining in the longish direction and the number of machining in the face direction. The subscript of the array is, in correspondence with 1/10 the determination value, as follows:

$$\left.\begin{array}{l}\text{when } 0.0 \leq \text{ the determination value} < 0.1, \text{ the subscript} = 0 \\ \text{when } 0.1 \leq \text{ the determination value} < 0.2, \text{ the subscript} = 1 \\ \text{when } 0.9 \leq \text{ the determination value} < 1.0, \text{ the subscript} = 9\end{array}\right\} \quad (5)$$

Figure 12:
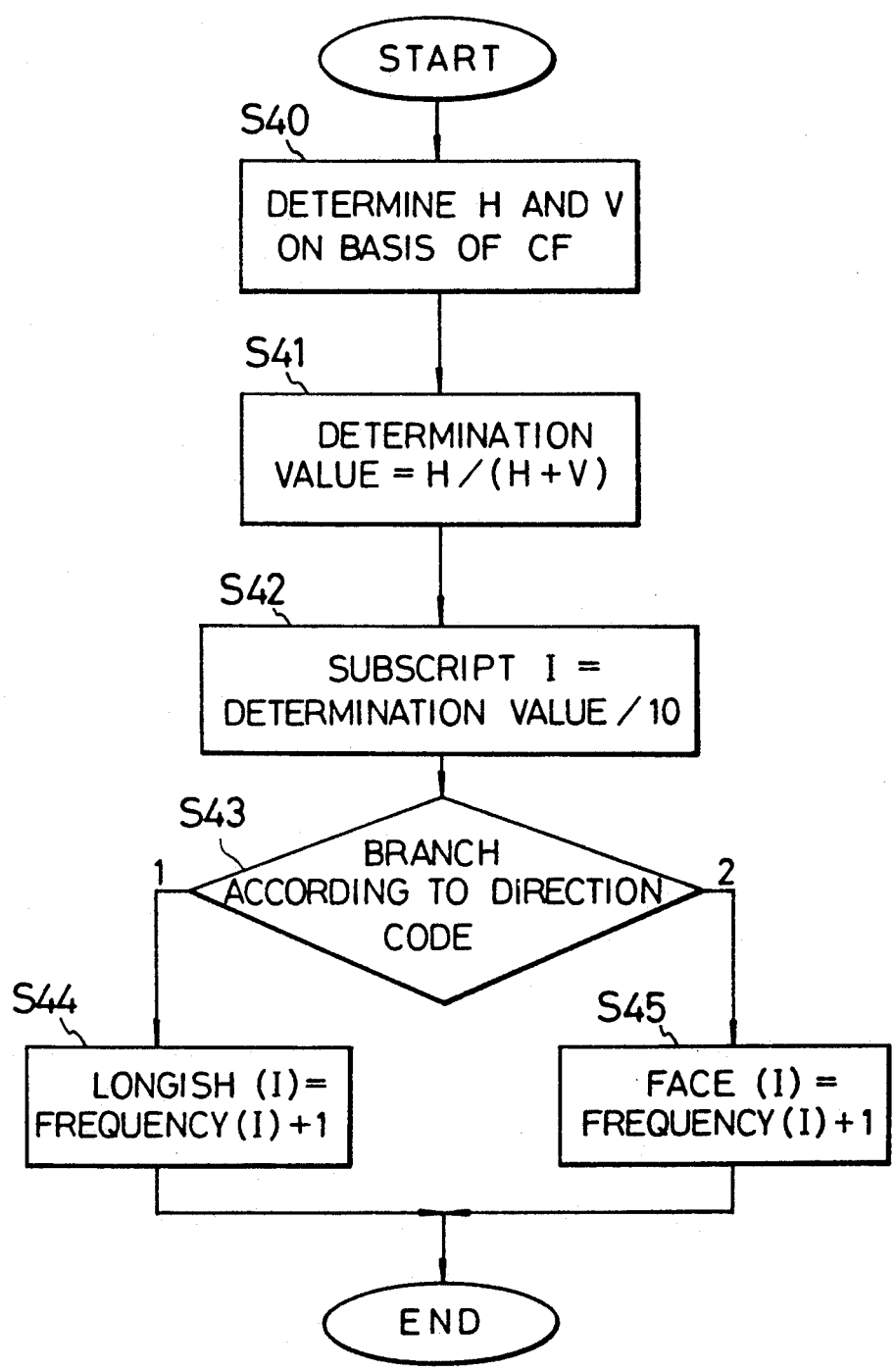
FIG. 12 is a flow chart explaining a process for updating the frequency distribution table.

The process shown in FIG. 12 is performed to update the frequency distribution table at the time the numerical control information is completed and output from the numerical control information generating apparatus, that is, immediately before the numerical control information outputting section 10 of FIG. 7 is executed. The flow chart of FIG. 12 will be explained below.

Figure 5:
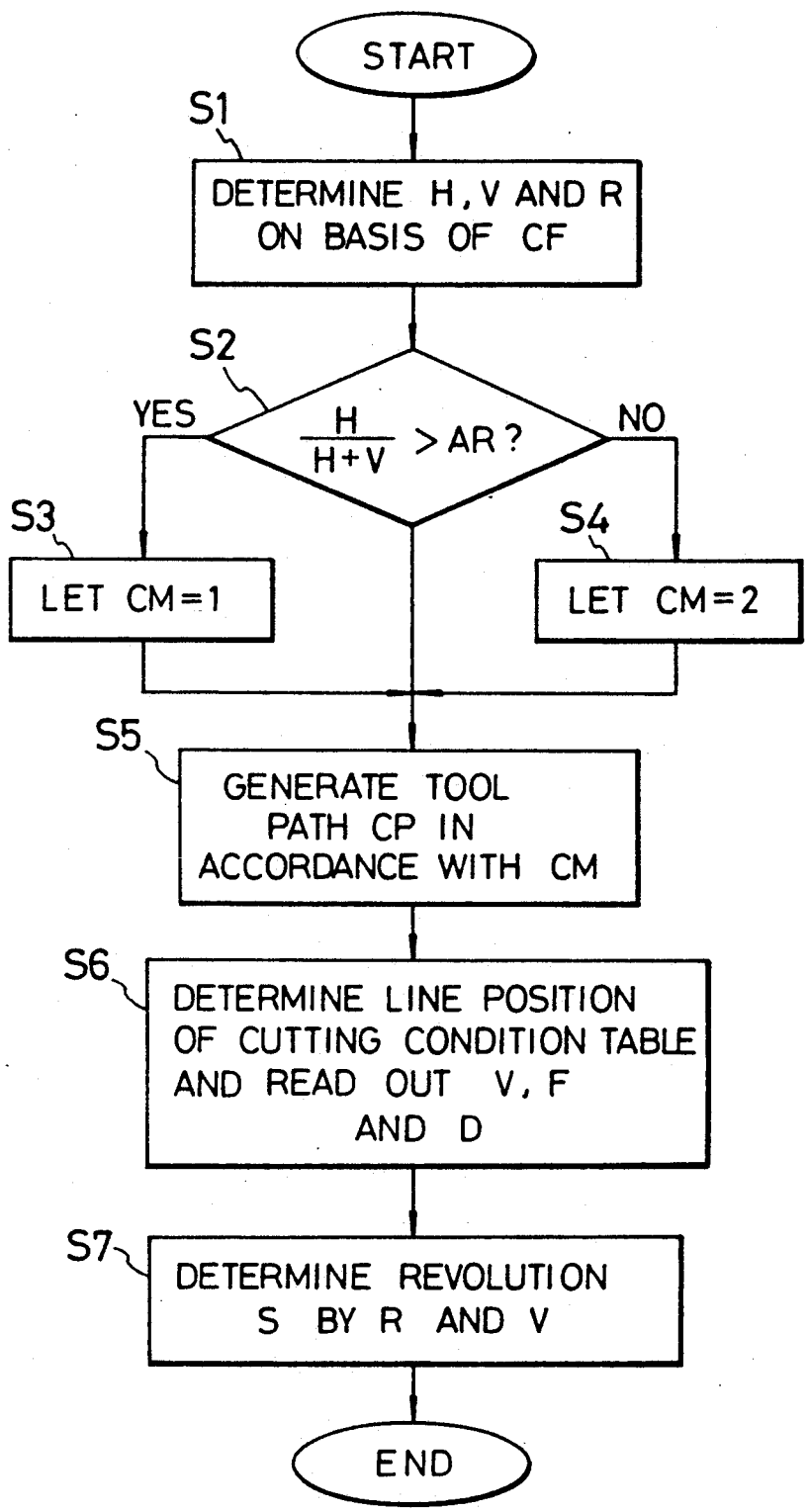
FIG. 5 is a flow chart explaining a conventional numerical control information generating process.

The lateral size H and the longitudinal size V are determined in the same way as in the above-described Step S1 in FIG. 5 (Step S40). The determination value is determined by the value "H/(H+V)" (Step S41). The subscript I of the array is determined by the determination value/10 (Step S42). Next, the machining direction code of the numerical control information storage section 9A in FIG. 7 is determined (Step S43). If it is "1", i.e., the longish direction, "1" is added to the longish frequency (I) (Step S44). If it is "2", i.e., the face direction, "1" is added to the face frequency (I), and then the process is terminated (Step S45).

Next, a process in which a value to be written in the determination value of the machining conditions by using the frequency distribution table will be explained with reference to the flow chart in FIG. 13. This process is performed by the machining condition automatic correcting section 12 shown in FIG. 7.

Figure 13:
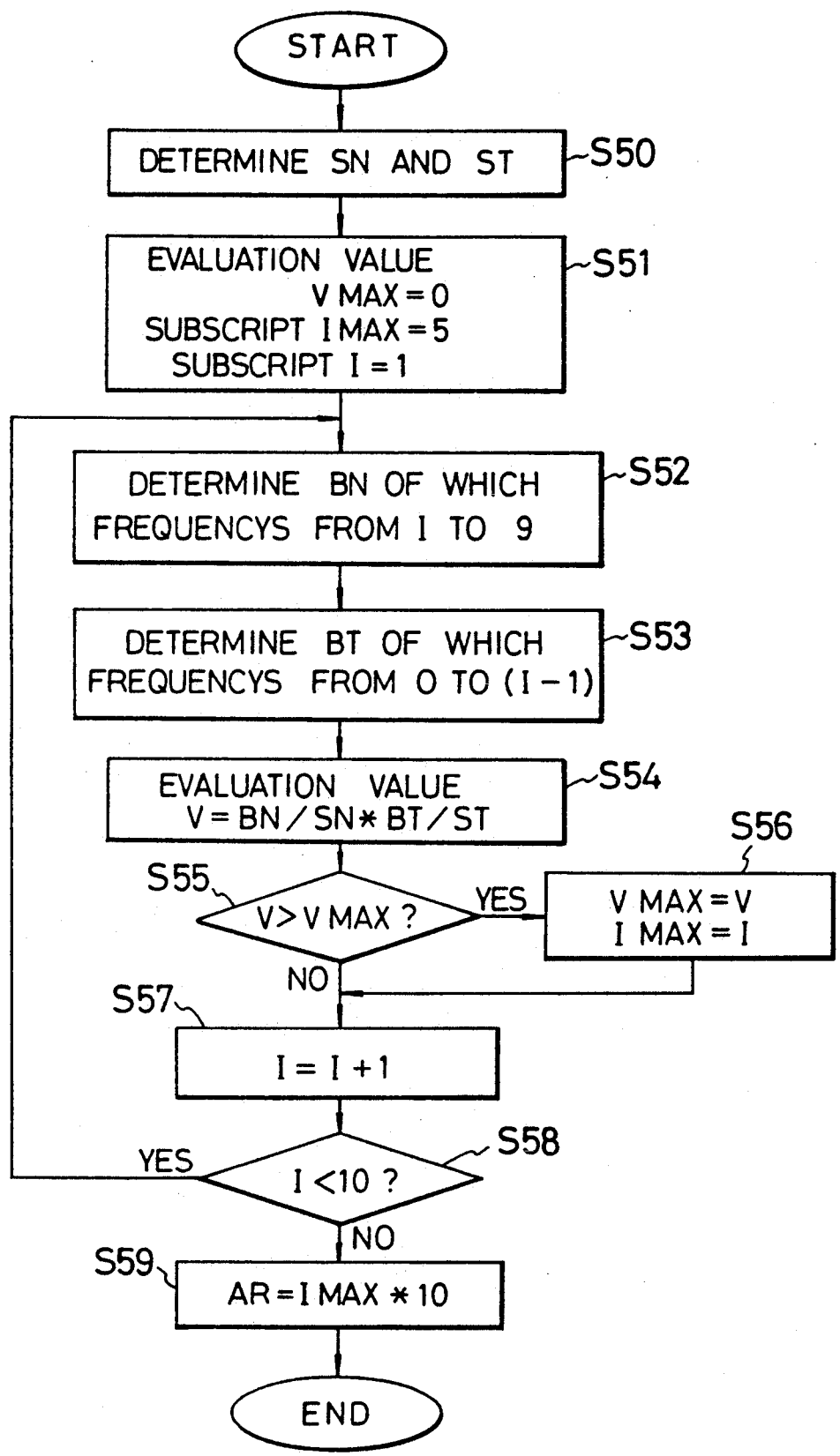
FIG. 13 is a flow chart explaining the main section of a machining conditions automatic correction process in which the frequency distribution table is used.

First, a longish total frequency SN, of which all of the frequencies from a longish frequency, (0) to a longish frequency (9) are added, and a face total frequencies ST, of which all of the frequencies from a face frequency (0) to a face frequency (9) are added, are determined (Step S50). A maximum value VMAX of evaluation values is initialized to "0", a subscript of an array when the evaluation value becomes VMAX is initialized to the central value "5", and the subscript I used to search the array is initialized to "1" (Step S51). Next, a longish part frequency BN, of which all of the frequencies from a longish frequency (I) to a longish frequency (9) are added, is determined (Step S52). A face part frequency BT, of which all of the frequencies from a face frequency (0) to a face frequency (I−1) are added, is determined (Step S53). When the determination value is assumed to be I×10 by BN/SN, the ratio of longish machining operations which are determined correctly is determined. When the determination value is assumed to be I×10 by BT/ST, the ratio of face machining operations which are determined correctly is determined. The product of the above two ratios is assumed to be an evaluation value V (Step S54). Whether or not this evaluation value V is greater than the maximum value VMAX is determined (Step S55). If it is greater, the value VMAX is updated, and "I" at that time is set to "IMAX", and the process proceeds to the Step S57 (Step S57). If it is not greater, no action is performed, and then the process proceeds to the Step S57. Next, "I" is added with "1" (Step S57). If "I" is smaller than "10", the process returns to the Step S52; if it is not smaller, the process proceeds to the Step S59 (Step S58). "IMAX"×10" is written in the machining direction determination value AR of the machining condition storage section 4 shown in FIG. 7, and then the process is terminated (Step S59).

Where past determination values and numerical control information related to the determination values are to be stored in sequence, a frequency distribution table should be created by performing a process equivalent to the process explained in FIG. 12 before the process explained in FIG. 13 is performed by the machining condition automatic correcting section 12.

As has been explained above, in the numerical control information generating apparatus of the present invention, since the machining conditions can be corrected automatically by correcting numerical control information even in a case where the machining conditions are not proper, proper machining conditions can be set easily even if an operator does not understand the relationship between the machining conditions and the generated numerical control information. Since the numerical control information is generated according to the corrected cutting conditions the next time and so on, proper numerical control information is automatically generated and thus numerical control information need not be corrected.

In addition, since an operator can select at will the conditions under which a process for automatically correcting machining conditions works on the basis of correction results of the numerical control information in the numerical control information correction process, the process can be made not to work in a case where the numerical control information is corrected because it is not common machining. Even at that time, excellent operability such that machining conditions can be corrected automatically at any time as required can be obtained.

Many widely different embodiments of the present invention can be made without departing from the spirit and scope thereof, therefore, it is to be understood that this invention is not limited to the specific embodiment thereof except as defined in the appended claims.

What is claimed is:

1. A numerical control information generating apparatus comprising:
    a machining condition storage means for storing machining conditions;
    a machining shape storage means for storing machining shapes;
    a numerical control information storage means for storing numerical control information;
    a numerical control information generating means for generating the numerical control information stored in said numerical control information storage means according to the machining conditions stored in said machining conditions storage means and the machining shapes stored in said machining shape storage means;
    a numerical control information correcting means for correcting the numerical control information stored in said numerical control information storage means; and,
    a machining condition automatic correcting means for calculating new machining conditions according to the corrected numerical control information stored in said numerical control information storage means and the machining shapes stored in said machining shape storage means and for correcting the machining conditions stored in the machining condition storage section according to the calculated new machining conditions, wherein said machining condition automatic correcting section includes means for performing the inverse of the function for calculating the numerical control information from the machining conditions and the machining shapes contained in said numerical control information generating means.

2. A numerical control information generating apparatus as claimed in claim 1, further including a memory for storing the machining conditions and a history of the corrected numerical control information when the numerical control information is corrected and an operating means for reading out data of said memory and analyzing the read out data by using a statistical technique using average values, weighted average values and a frequency distribution table, wherein said machining condition automatic correcting means includes means for receiving analyzed results of the operation means and correcting the machining conditions stored in said machining condition storage means.

3. A numerical control information generating apparatus as claimed in claim 1, wherein said machining condition storage means stores a machining direction judging value which said numerical control information generating means reads when the direction of the numerical control information is decided with the machining shape, and said machining condition automatic correcting means includes means for calculating a corrected machining direction judging value due to the machining shape and the corrected machining direction if the machining direction of the numerical control information is corrected and for correcting the machining direction judging value stored in the machining condition storage means.

4. A numerical control information generating apparatus as claimed in claim 1, wherein said machining condition storage means includes a cutting condition table which said numerical control information generating means reads when the cutting conditions of the numerical control information are decided with the machining shape, and said machining condition automatic correcting means includes means for calculating correcting positions and correcting values of the cutting condition table due to the machining shape and the corrected cutting conditions if the machining conditions of the numerical control information are corrected and for correcting the cutting condition table stored in the machining condition storage means.

* * * * *